(12) United States Patent
Nakao

(10) Patent No.: US 11,620,882 B2
(45) Date of Patent: Apr. 4, 2023

(54) ACTUATOR AND TACTILE SENSATION PROVIDING APPARATUS

(71) Applicant: KYOCERA Corporation, Kyoto (JP)

(72) Inventor: Fumiaki Nakao, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/057,928

(22) PCT Filed: May 14, 2019

(86) PCT No.: PCT/JP2019/019090
§ 371 (c)(1),
(2) Date: Nov. 23, 2020

(87) PCT Pub. No.: WO2019/230367
PCT Pub. Date: Dec. 5, 2019

(65) Prior Publication Data
US 2021/0312770 A1 Oct. 7, 2021

(30) Foreign Application Priority Data
May 28, 2018 (JP) .............................. JP2018-101813

(51) Int. Cl.
*G08B 6/00* (2006.01)
*B06B 1/06* (2006.01)
*G06F 3/01* (2006.01)
*H02N 2/04* (2006.01)

(52) U.S. Cl.
CPC .............. *G08B 6/00* (2013.01); *B06B 1/0644* (2013.01); *G06F 3/016* (2013.01); *H02N 2/04* (2013.01)

(58) Field of Classification Search
CPC .......... G08B 6/00; H02N 2/04; B06B 1/0644; G06F 3/016
See application file for complete search history.

(56) References Cited

U.S. PATENT DOCUMENTS

| 2009/0096326 | A1  | 4/2009 | Onishi et al. |
| 2016/0224115 | A1* | 8/2016 | Olien ................. G06F 3/04883 |
| 2019/0074425 | A1  | 3/2019 | Nakao |
| 2019/0081231 | A1  | 3/2019 | Takeda |

FOREIGN PATENT DOCUMENTS

| JP | 2017-175874 A | 9/2017 |
| WO | 2014/098429 A1 | 6/2014 |
| WO | 2017-163917 A1 | 9/2017 |

* cited by examiner

*Primary Examiner* — Quan Zhen Wang
*Assistant Examiner* — Rajsheed O Black-Childress
(74) *Attorney, Agent, or Firm* — Studebaker & Brackett PC

(57) ABSTRACT

An actuator and a tactile sensation providing apparatus that can reduce the number of elements are provided. The actuator includes a piezoelectric element and a diaphragm that has the piezoelectric element attached thereto and vibrates according to an expanding and contracting displacement of the piezoelectric element. The diaphragm converts the expanding and contracting displacement of the piezoelectric element into a vibration in a predetermined direction. The diaphragm supports a vibration object for providing a tactile sensation, in a displaceable manner.

8 Claims, 8 Drawing Sheets

ACTUATOR AND TACTILE SENSATION PROVIDING APPARATUS

CROSS REFERENCE TO RELATED APPLICATION

This application claims priority to and the benefit of Japanese Patent Application No. 2018-101813 filed on May 28, 2018, the entire contents of which are incorporated herein by reference.

TECHNICAL FIELD

The present disclosure relates to an actuator and a tactile sensation providing apparatus.

BACKGROUND

Conventionally, apparatuses to provide a tactile sensation to a user are known.

SUMMARY

An actuator according to one embodiment includes a piezoelectric element and a diaphragm that has the piezoelectric element connected thereto and vibrates according to an expanding and contracting displacement of the piezoelectric element. The diaphragm converts the expanding and contracting displacement of the piezoelectric element into a vibration in a predetermined direction. The diaphragm supports a vibration object for providing a tactile sensation, in a displaceable manner.

A tactile sensation providing apparatus includes a vibration object for providing a tactile sensation and an actuator. The actuator includes a piezoelectric element and a diaphragm that has the piezoelectric element connected thereto and vibrates according to an expanding and contracting displacement of the piezoelectric element. The diaphragm converts the expanding and contracting displacement of the piezoelectric element into a vibration in a predetermined direction. The diaphragm supports the vibration object for providing a tactile sensation, in a displaceable manner.

DETAILED DESCRIPTION

Figure 1:
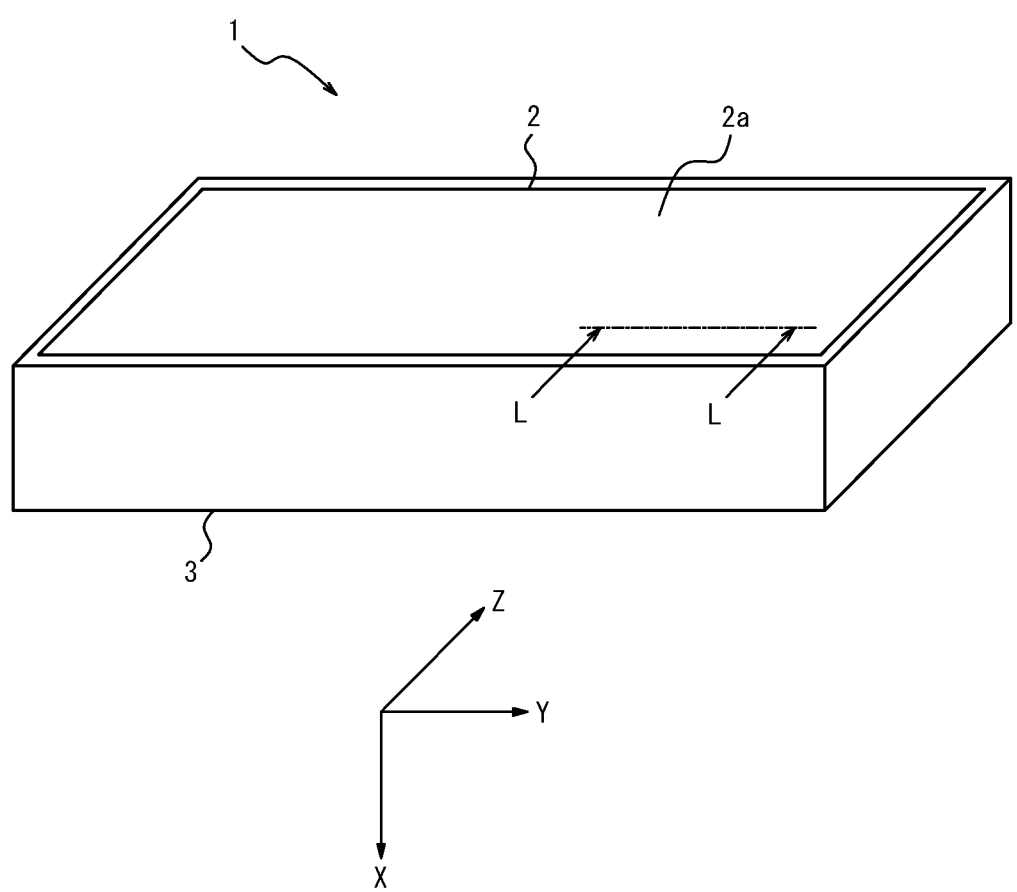
FIG. 1 is a diagram illustrating an exterior configuration of a tactile sensation providing apparatus according to an embodiment of the present disclosure.

Conventional apparatuses are required to reduce the number of elements used therein for cost reduction and simplification of an assembly process.

The present disclosure aims to provide an actuator and a tactile sensation providing apparatus that can reduce the number of elements.

According to the present disclosure, an actuator and a tactile sensation providing apparatus that can reduce the number of elements can be provided.

Hereinafter, embodiments according to the present disclosure will be described with reference to the drawings. Hereinafter, the same reference numerals will be given to common elements in each drawing. Note that the drawings used in the following description are merely schematic. The drawings are not necessarily drawn to scale.

Example Configuration of Tactile Sensation Providing Apparatus

Figure 2:
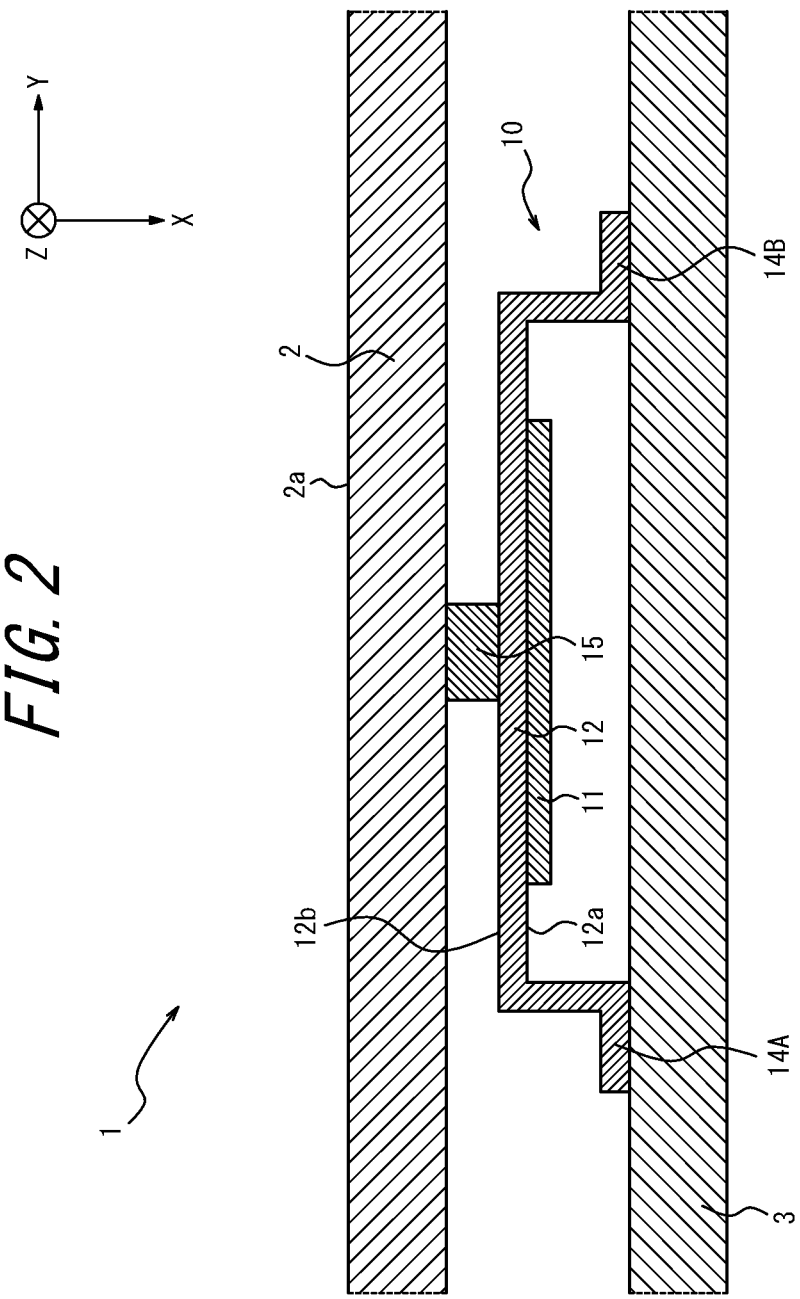
FIG. 2 is an XY plane cross-sectional view of the tactile sensation providing apparatus taken along line L-L illustrated in FIG. 1.

FIG. 1 is a diagram illustrating an exterior configuration of a tactile sensation providing apparatus 1 according to an embodiment of the present disclosure. FIG. 2 is an XY plane cross-sectional view of the tactile sensation providing apparatus 1 taken along line L-L illustrated in FIG. 1. As illustrated in FIG. 1, the tactile sensation providing apparatus 1 has a rectangular parallelepiped shape in appearance. Hereinafter, a thickness direction of the tactile sensation providing apparatus 1 will be referred to as an X-axis direction in FIG. 1 and FIG. 2. A longitudinal direction of the tactile providing apparatus 1 will be referred to as a Y-axis direction. A transverse direction of the tactile sensation providing apparatus 1 will be referred to as a Z-axis direction.

The tactile sensation providing apparatus 1 vibrates a vibration object 2 and thus provides a tactile sensation to a user who is touching a main surface 2a of the vibration object 2. Examples of the tactile sensation providing apparatus 1 include a vehicle-mounted apparatus such as a car navigation system, a steering wheel, or a power window switch, or the like. Further, examples of the tactile sensation providing apparatus 1 include a mobile phone, a smartphone, a tablet PC (Personal Computer), or a notebook PC. However, the tactile sensation providing apparatus 1 is not limited thereto. The tactile sensation providing apparatus 1 may be various electronic apparatuses including a desktop PC, a home electric appliance, an industrial apparatus (FA (Factory Automation) apparatus), a dedicated terminal, or the like.

The tactile sensation providing apparatus 1 includes the vibration object 2, a housing 3, and an actuator 10, as illustrated in FIG. 1 and FIG. 2.

The vibration object 2 includes the main surface 2a. The user touches the main surface 2a with a finger or the like. The vibration object 2 may be a touch sensor arranged in a display panel. However, the vibration object 2 is not limited to the touch sensor. For example, the vibration object 2 may be a switch. A vibration of the actuator 10 is transmitted to the vibration object 2. The vibration object 2 is vibrated when the vibration object 2 receives the vibration of the actuator 10.

A vibrating direction of the vibration object 2 includes, for example, an in-plane direction and an out-of-plane direction. The in-plane direction is a direction substantially parallel to the main surface 2a of the vibration object 2. For example, the in-plane direction is a direction parallel to a ZY plane in FIG. 1. Thus, a vibration in the in-plane direction corresponds to, for example, a vibration in the Z-axis direction in FIG. 1. The out-of-plane direction is a direction orthogonal to the main surface 2a of the vibration object 2. Thus, a vibration in the out-of-plane direction corresponds to a vibration in the X-axis direction in FIG. 1. Hereinafter, the vibration in the in-plane direction will also be referred to as "transverse vibration". Also, the vibration in the out-of-plane direction will also be referred to as "longitudinal vibration".

The housing 3 may be formed from metal, synthetic resin, or the like. The housing 3 protects the internal structure of the tactile sensation providing apparatus 1. The housing 3 may enclose the actuator 10, a controller, a memory, and the like. The controller may be a processor, a microcomputer or the like that is capable of executing application software. The controller is connected to the actuator 10. The controller outputs a driving signal for vibrating the actuator 10 to the actuator 10. The driving signal may be a voltage signal or a current signal. The memory may be a semiconductor memory, a magnetic memory, or the like. The memory stores various information and programs for operating the controller. The controller and the memory may be provided external to the housing 3.

The actuator 10 is arranged between the vibration object 2 and the housing 3, as illustrated in FIG. 2. Actuators 10 may be arranged at four corners of the tactile sensation providing apparatus 1 having a rectangular parallelepiped shape as illustrated in FIG. 1. The actuator 10 converts the voltage signal output by the controller of the tactile sensation providing apparatus 1 into a vibration. The vibration converted by the actuator 10 is transmitted to the vibration object 2. The actuator 10 vertically vibrates the vibration object 2. The vibration object 2 may be laterally vibrated by appropriately changing the arrangement of the actuator 10.

Example Configuration of Actuator

Figure 3:
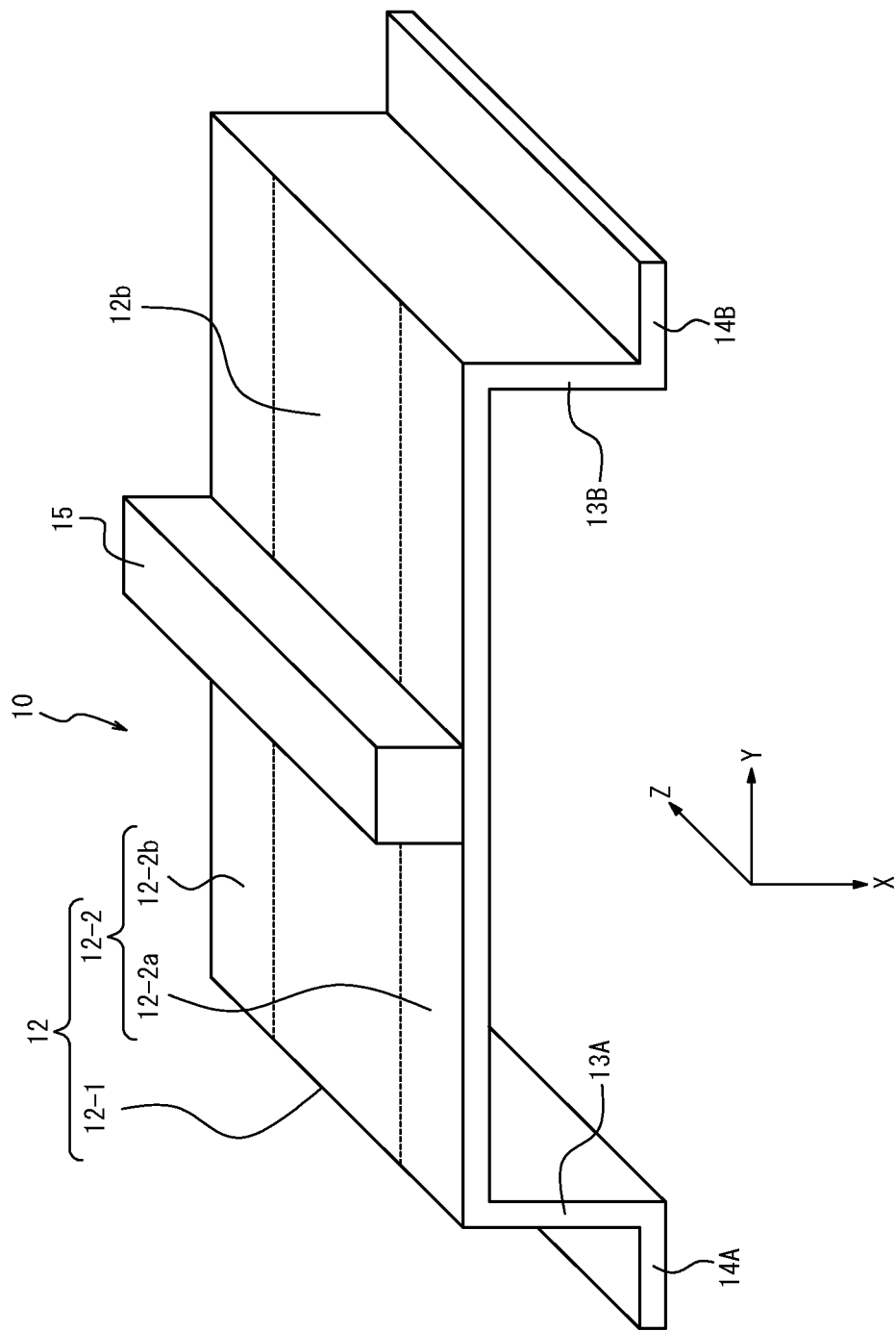
FIG. 3 is a perspective view of an actuator illustrated in FIG. 2 as viewed from a vibration object side.
Figure 4:
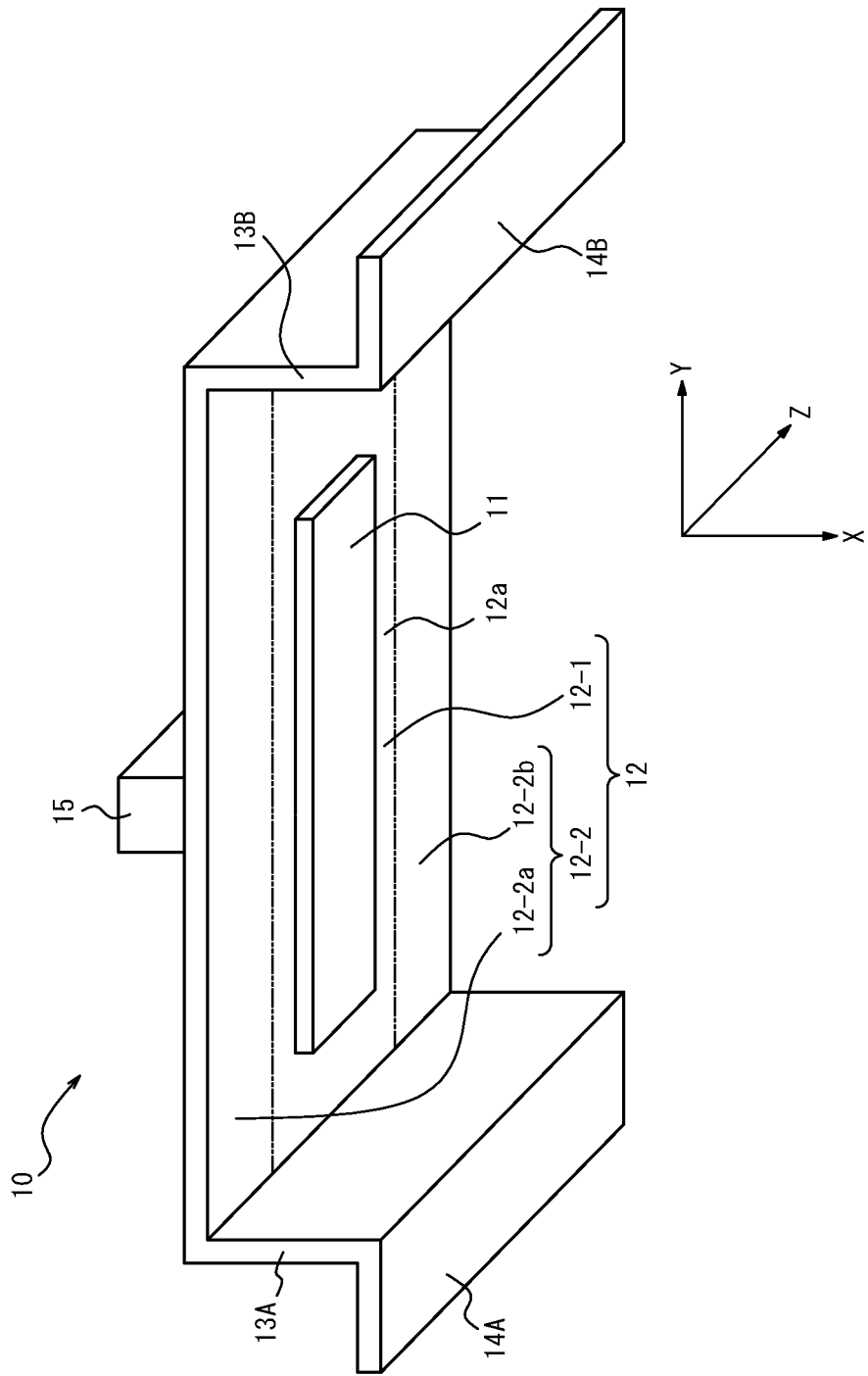
FIG. 4 is a perspective view of the actuator illustrated in FIG. 2 as viewed from a housing side.

FIG. 3 is a perspective view of the actuator 10 illustrated in FIG. 2 as viewed from a side on which the vibration object 2 is located. FIG. 4 is a perspective view of the actuator 10 illustrated in FIG. 2 as viewed from a side on which the housing 3 is located.

The actuator 10 includes a piezoelectric element 11, a diaphragm 12, supporting portions 13A and 13B, fixing portions 14A and 14B, and a retainer 15. The diaphragm 12, the support portions 13A and 13B, and the fixing portions 14A and 14B may be integrally formed by, for example, bending one thin plate. Alternatively, the diaphragm 12, the support portions 13A and 13B, and the fixing portions 14A and 14B may be formed from separate members. In a case in which the diaphragm 12, the support portions 13A and 13B, and the fixing portions 14A and 14B are formed from separate members, the diaphragm 12, the support portions 13A and 13B, and the fixing portions 14A and 14B may be integrated by welding or the like.

The piezoelectric element 11 has, for example, a rectangular shape. The voltage signal output from the controller of the tactile sensation providing apparatus 1 is applied to the piezoelectric element 11. The piezoelectric element 11 is displaced expanding and contracting in the longitudinal direction according to the voltage signal applied thereto. The piezoelectric element 11 may be a piezoelectric film or a piezoelectric ceramic. The piezoelectric ceramic can generate a vibration with greater vibrational energy than a piezoelectric film.

The piezoelectric element 11 may be substituted by a magnetostrictor. The magnetostrictor expands and contracts according to a magnetic field applied thereto. In a case in which the piezoelectric element 11 is substituted by the magnetostrictor, the actuator 10 may include a coil or the like that converts the driving signal output from the controller of the tactile sensation providing apparatus 1 illustrated in FIG. 1 into a magnetic field.

The diaphragm 12 is a plate having elasticity such as, for example, a shim plate. The diaphragm 12 may be a plate-like member having a predetermined thickness. The diaphragm 12 may be formed from metal, resin, or a composite material of metal, resin, and the like. One end of the diaphragm 12 is supported by the support portion 13A. The other end of the diaphragm 12 is supported by the support portion 13B. Hereinafter, of the two surfaces of the diaphragm 12, a surface facing the housing 3 will also be referred to as "main surface 12$a$". Further, of the two surfaces of the diaphragm 12, a surface facing the vibration object 2 will also be referred to as "main surface 12$b$".

The diaphragm 12 converts the expanding and contracting displacement of the piezoelectric element 11 into a vibration in a predetermined direction. Hereinafter, the mechanism in which the diaphragm 12 converts the expanding and contracting displacement of the piezoelectric element 11 into the vibration in the predetermined direction will also be referred to as "conversion mechanism". Also, the diaphragm 12 supports the vibration object 2 illustrated in FIG. 2 described above with respect to the housing 3 in a displaceable manner. Hereinafter, the mechanism in which the diaphragm 12 supports the vibration object 2 in the displaceable manner will also be referred to as "support mechanism". Hereinafter, the conversion mechanism is assumed to be implemented by a first plate 12-1 of the diaphragm 12, for convenience of description. Also, the support mechanism is assumed to be implemented by a second plate 12-2 of the diaphragm 12. However, the diaphragm 12 as a whole may implement the conversion mechanism and the support mechanism. The first plate 12-1 and the second plate 12-2 may be formed from the same material or different materials.

The first plate 12-1 implements the conversion mechanism. The piezoelectric element 11 may be provided on the main surface 12$a$ of the first plate 12-1. The piezoelectric element 11 may be provided on the main surface 12$a$ of the first plate 12-1 so that the longitudinal direction of the piezoelectric element 11 matches the longitudinal direction of the diaphragm 12. The piezoelectric element 11 may be bonded to the main surface 12$a$ of the first plate 12-1 via an adhesive or the like. The structure in which the piezoelectric element is provided on the main surface 12$a$ of the first plate 12-1 is a so-called unimorph. For example, when the piezoelectric element 11 is displaced expanding and contracting, the first plate 12-1 vibrates so that the amplitude in the normal of the main surface 12$a$ in the vicinity of the center of the first plate 12-1 is maximized. In other words, the first plate 12-1 converts the expanding and contracting displacement of the piezoelectric element 11 into a vibration in the normal (X-axis direction) of the main surface 12$a$ in the vicinity of the center of the first plate 12-1.

The first plate 12-1 has a first spring constant K1. The first spring constant K1 may be determined based on a desired amplitude (a maximum displacement value) in the normal of the main surface 12$a$ in the vicinity of the center of the first plate 12-1. For example, the first spring constant K1 may be calculated by dividing a force applied to the first plate 12-1 when the expanding and contracting displacement of the piezoelectric element 11 is maximized, by a desired amplitude in the normal of the main surface 12$a$ in the vicinity of the center of the first plate 12-1. In this case, the first spring constant K1 can be calculated from the following equation (1).

$$K1 = F1/U1 \quad \text{Equation(1)}$$

In the equation (1), F1 is a force applied to the first plate 12-1 when the expanding and contracting displacement of the piezoelectric element 11 is maximized. U1 is a desired amplitude in the normal of the main surface 12a in the vicinity of the center of the first plate 12-1.

The second plate 12-2 implements a support mechanism. For example, the second plate 12-2 supports the vibration object 2 such that the vibration of the first plate 12-1 is transmitted to the vibration object 2 and whereby the vibration object 2 is displaced with respect to the housing 3, namely, the vibration object 2 is vibrated. That is, the second plate 12-2 supports the vibration object 2 so that the vibration object 2 vibrates and thus provides a tactile sensation to the user. The second plate 12-2 may have a plate 12-2a located on one side of the first plate 12-1 and a plate 12-2b located on the other side of the first plate 12-2.

The second plate 12-2 has a second spring constant K2. The second spring constant K2 may be a sum of a spring constant of the plate 12-2a and a spring constant of the plate 12-2b. The second spring constant K2 may be determined based on a desired amplitude of the vibration object 2. For example, the second spring constant K2 may be calculated by dividing a force applied to the second plate 12-2 when the expanding and contracting displacement of the piezoelectric element 11 is maximized, by the desired amplitude of the vibration object 2. For example, the second spring constant K2 can be calculated from the following equation (2).

$$K2 = (F2 - F1)/U2 \qquad \text{Equation (2)}$$

In the equation (2), F2 is a force applied to the diaphragm 12 when the expanding and contracting displacement of the piezoelectric element 11 is maximized. A force applied to the second plate 12-2 when the expanding and contracting displacement of the piezoelectric element 11 is maximized can be calculated from a formula (F2−F1). U2 is the desired amplitude of the vibration object 2.

Here, a spring constant Ku of the diaphragm 12 is a sum of the first spring constant K1 and the second spring constant K2. For example, the spring constant Ku can be calculated from an equation (3).

$$Ku = K1 + K2 \qquad \text{Equation (3)}$$

Figure 5:
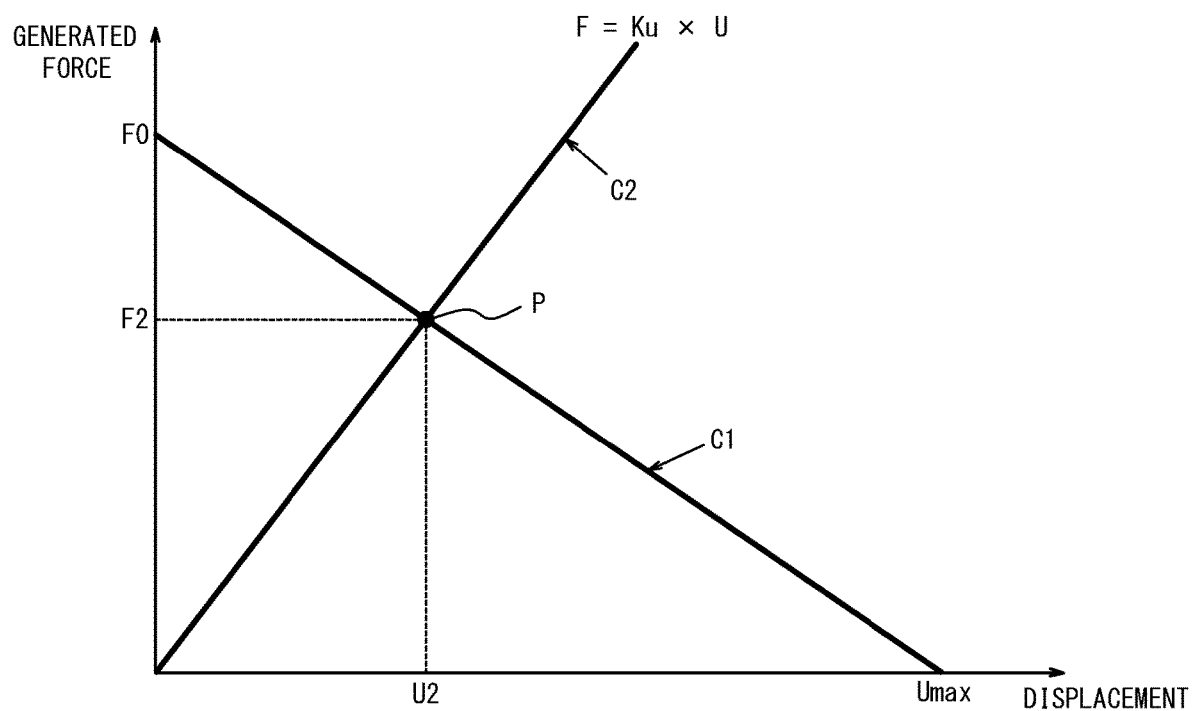
FIG. 5 is a graph illustrating a driving characteristic of the actuator.

FIG. 5 illustrates a driving characteristic of the actuator 10. In FIG. 5, the horizontal axis represents a displacement. The vertical axis represents a force. A characteristic C1 represents a driving characteristic of a configuration in which the piezoelectric element 11 is bonded to the main surface 12a of the first plate 12-1, i.e., a driving characteristic of the unimorph. A characteristic C2 represents a characteristic of a load applied to the unimorph by the vibration object 2 or the like via the diaphragm 12. F0 is, for example, a maximum value of the force generated in the unimorph when a maximum value of the voltage is applied to the piezoelectric element 11. In other words, F0 is a force generated in the piezoelectric element 11 when the displacement of the first plate 12-1 is 0. Umax is a maximum value of the displacement of unimorph, that is, an amplitude in the normal of the main surface 12a in the vicinity of the center of the first plate 12-1. The actuator 10 operates at a point where the force generated in the unimorph and the load applied to the unimorph are in balance. Thus, an operating point of the actuator 10 is an intersection P of the characteristic C1 and the characteristic C2. Accordingly, a maximum displacement value of the actuator 10, i.e., the amplitude (maximum displacement) of the vibration object 2 is U2. Further, when the displacement of the vibration object 2 is the maximum value of U2, the load applied to the unimorph by the vibration object 2 and the like via the diaphragm 12 is F2.

The support portion 13A illustrated in FIG. 3 and FIG. 4 is provided at one end of the longitudinal direction of the diaphragm 12. One end of the support 13A is connected to the diaphragm 12. The other end of the support portion 13A is connected to the fixing portion 14A. The support portion 13B is provided on the other end of the longitudinal direction of the diaphragm 12. One end of the support portion 13B is connected to the diaphragm 12. The other end of the support 13B is connected to the fixing portion 14B.

The supporting portions 13A and 13B support the diaphragm 12 in a manner so that a gap is formed between the piezoelectric element 11 and the housing 3. The gap formed between the piezoelectric element 11 and the housing 3 can suppress the piezoelectric element 11 from colliding with the housing 3 when the diaphragm 12 is vibrated according to the vibration of the piezoelectric element 11. The support portions 13A and 13B may be formed from the same material as the diaphragm 12 or a material different from that of the diaphragm 12.

The fixing portions 14A and 14B are fixed to the housing 3. The fixing portions 14A and 14B may be fixed to the housing 3 via, for example, a fastening member such as a screw or an adhesive. The fixing portions 14A and 14B may be formed from the same material as the diaphragm 12 or a material different from that of the diaphragm 12.

The retainer 15 supports the vibration object 2. The retainer 15 may be formed from a metal, a resin, or a composite material of metal, resin, and the like. The retainer 15 is provided in the vicinity the center of the main surface 12b of the diaphragm 12. The retainer 15 is connected to the diaphragm 12 via an adhesive or the like. Further, the vibration object 2 is bonded to the retainer 15 with an adhesive or the like.

Comparative Example

Figure 6:
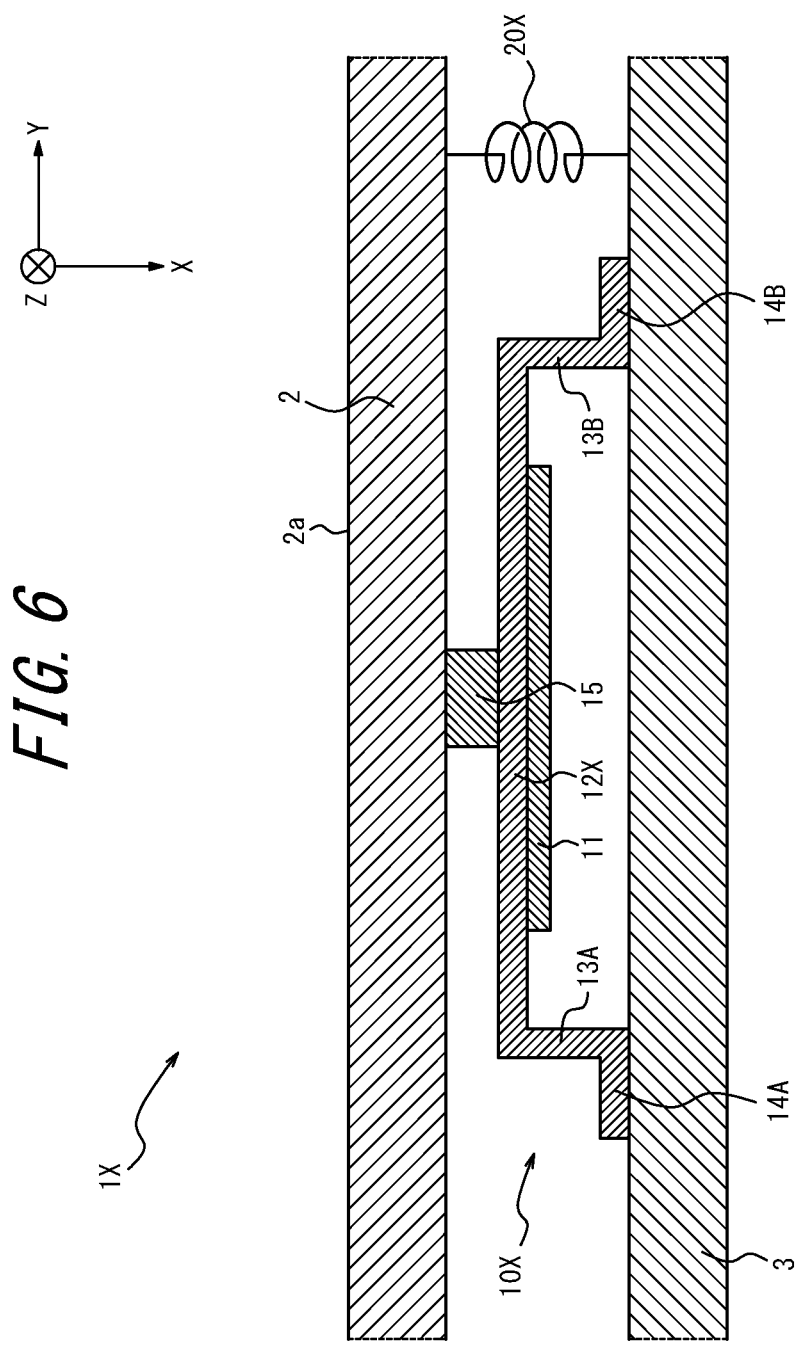
FIG. 6 is a cross-sectional view of a tactile sensation providing apparatus according to a comparative example.

FIG. 6 is a cross-sectional view of a tactile sensation providing apparatus 1X according to a comparative example. FIG. 6 corresponds to FIG. 2 described above. The tactile sensation providing apparatus 1X according to the comparative example includes the vibration object 2, the housing 3, an actuator 10X, and an elastic member 20X.

The actuator 10X includes the piezoelectric element 11, a diaphragm 12X, the support portions 13A and 13B, the fixing portions 14A and 14B, and the retainer 15.

The diaphragm 12X has the same shape as the first plate 12-1 illustrated in FIG. 3 and FIG. 4 described above. The diaphragm 12X corresponds to the first plate 12-1. In other words, the diaphragm 12X converts the expanding and contracting displacement of the piezoelectric element 11 into a vibration in a predetermined direction, in a manner similar to the first plate 12-1. The diaphragm 12X has a first spring constant K1, in a manner similar to the first plate 12-1.

The elastic member 20X is, for example, a coil spring. The elastic member 20X is connected between the vibration object 2 and the housing 3.

The elastic member 20X corresponds to the second plate 12-2 illustrated in FIG. 3 and FIG. 4 described above. In other words, the elastic member 20X supports the vibration object 2 with respect to the housing 3 in a displaceable manner, in a manner similar to the second plate 12-2. The elastic member 20X has a second spring constant K2, in a manner similar to the second plate 12-2.

The actuator 10X and the elastic member 20X are connected in parallel between the vibration object 2 and the housing 3. Thus, a combined spring constant of the actuator 10X and the elastic member 20X coincides with the spring constant Ku (=K1+K2) of the diaphragm 12. Accordingly, the tactile sensation providing apparatus 1X according to the comparative example also can realize the same characteristics as the tactile sensation providing apparatus 1 according to the present embodiment.

As described above, the tactile sensation providing apparatus 1X according to the comparative example can provide a tactile sensation to the user by vibrating the vibration object 2 using the actuator 10X and the elastic member 20X, in a manner similar to the tactile sensation providing apparatus 1 according to the present embodiment.

However, the tactile sensation providing apparatus 1X according to the comparative example includes an elastic member 20X in addition to the actuator 10X. This increases the number of elements used in the tactile sensation providing apparatus 1X according to the comparative example. An increase in the number of elements used in the tactile providing apparatus 1X may lead to an increase in an assembly process or the manufacturing cost of the tactile providing apparatus 1X.

On the other hand, the tactile sensation providing apparatus 1 according to the present embodiment can cause the actuator 10 to vibrate the vibration object 2 such that a tactile sensation is provided to the user, without using the elastic member 20X. Thus, the present embodiment can reduce the number of elements used in the tactile sensation providing apparatus 1. According to the present embodiment, by reducing the number of elements used in the tactile providing apparatus 1, the probability to increase an assembly process and the manufacturing cost of the tactile sensation providing apparatus 1 can be reduced.

In the tactile sensation providing apparatus 1X according to the comparative example, further, the elastic member 20X needs to be mounted on the housing 3 or the like in addition to the actuator 10X. This may increase a mounting area of elements or the like in the tactile sensation providing apparatus 1X according to the comparative example.

On the other hand, the present embodiment does not need the elastic member 20X to be mounted on the housing 3 or the like. Thus, the present embodiment can reduce the probability to increase the mounting area of elements or the like.

Another Example Configuration of Actuator

Figure 7:
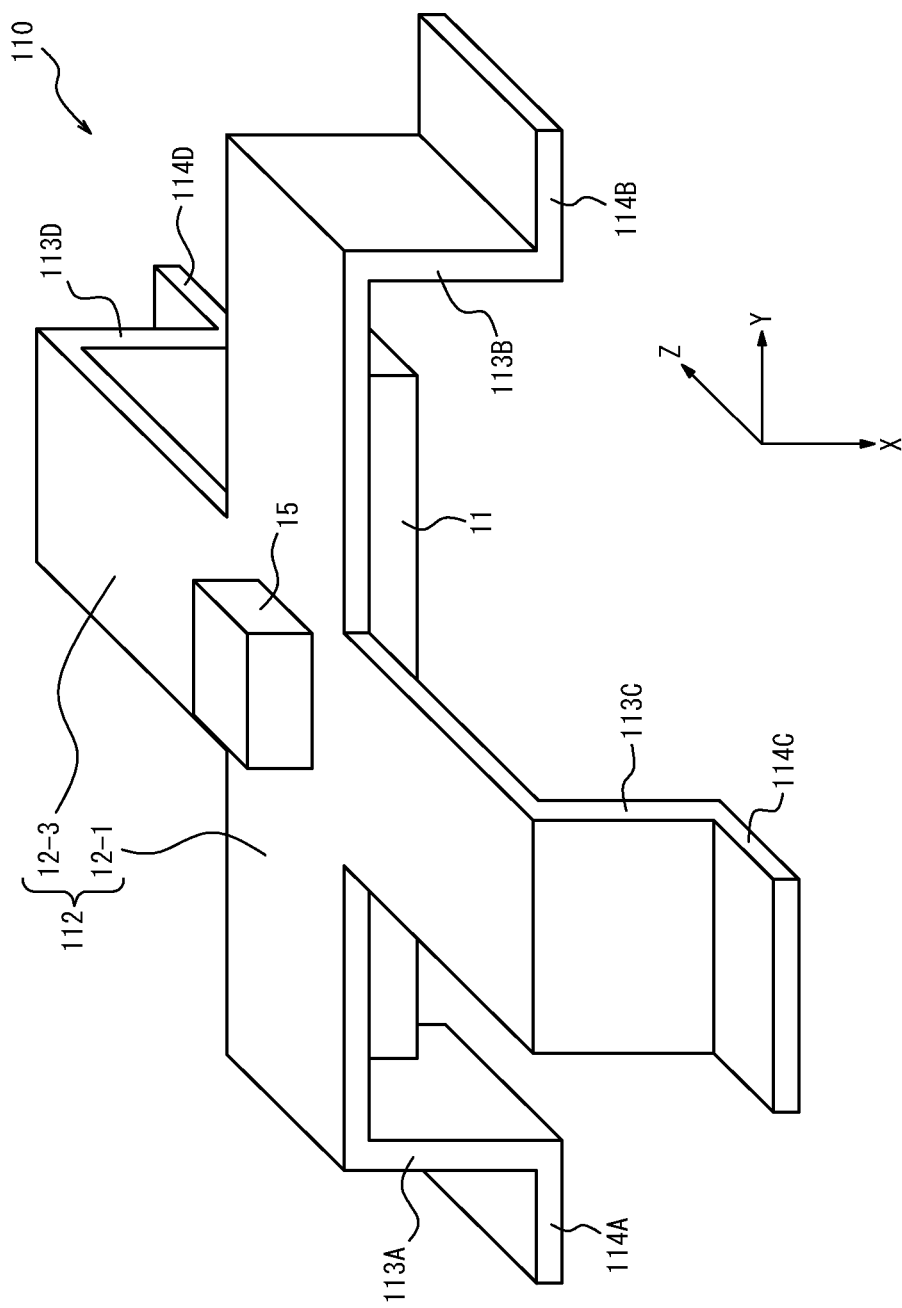
FIG. 7 is a perspective view of an actuator according to another embodiment of the present disclosure.

FIG. 7 is a perspective view of an actuator 110 according to another embodiment of the present disclosure. The actuator 110 includes the piezoelectric element 11, a diaphragm 112, support portions 113A, 113B, 113C and 113D, and fixing portions 114A, 114B, 114C and 114D.

The diaphragm 112 has a cross shape. The diaphragm 112 has a first plate 12-1 and a second plate 12-3.

The second plate 12-3 extends from the vicinity of the center of the first plate 12-1. The second plate 12-3 has a support mechanism, in a manner similar to the second plate 12-2 illustrated in FIG. 3. The second plate 12-3 has a second spring constant K2.

A spring constant Ku of the diaphragm 112 is based on a first spring constant K1 and the second spring constant K2, in a manner similar to the diaphragm 12 illustrated in FIG. 3 described above. The first plate 12-1 and the second plate 12-3 are connected in parallel between the vibration object 2 and the housing 3 via the supporting portions 113A to 113D, the fixing portions 114A to 114E, and the retainer 15. Thus, the spring constant Ku of the diaphragm 112 is given by the sum of the first spring constant K1 and the second spring constant K2, in a manner similar to the diaphragm 12 illustrated in FIG. 3.

The support portion 113A is provided at one end of the longitudinal direction of the first plate 12-1. One end of the support 113A is connected to the first plate 12-1. The other end of the support portion 113A is connected to the fixing portion 114A. The support portion 113B is provided at the other end of the longitudinal direction of the first plate 12-1. One end of the supporting portion 113B is connected to the first plate 12-1. The other end of the support 113B is connected to the fixing 114B.

The support portion 113C is provided atone end of the longitudinal direction of the second plate 12-3. One end of the support 113C is connected to the second plate 12-3. The other end of the support portion 113C is connected to the fixing portion 114C. The support 113D is provided at the other end of the longitudinal direction of the second plate 12-3. One end of the support portion 113C is connected to the second plate 12-3. The other end of the support portion 113C is connected to the fixing portion 114D.

The fixing portions 114A to 114D are fixed to the housing 3 illustrated in FIG. 2 described above. The fixing portions 114A to 114D may be fixed to the housing 3 via a fastening member such as, for example, a screw or an adhesive.

The actuator 110 as described above can exert an effect similar to that of the actuator 10 illustrated in FIG. 2 described above.

Still Another Example Configuration of Actuator

Figure 8:
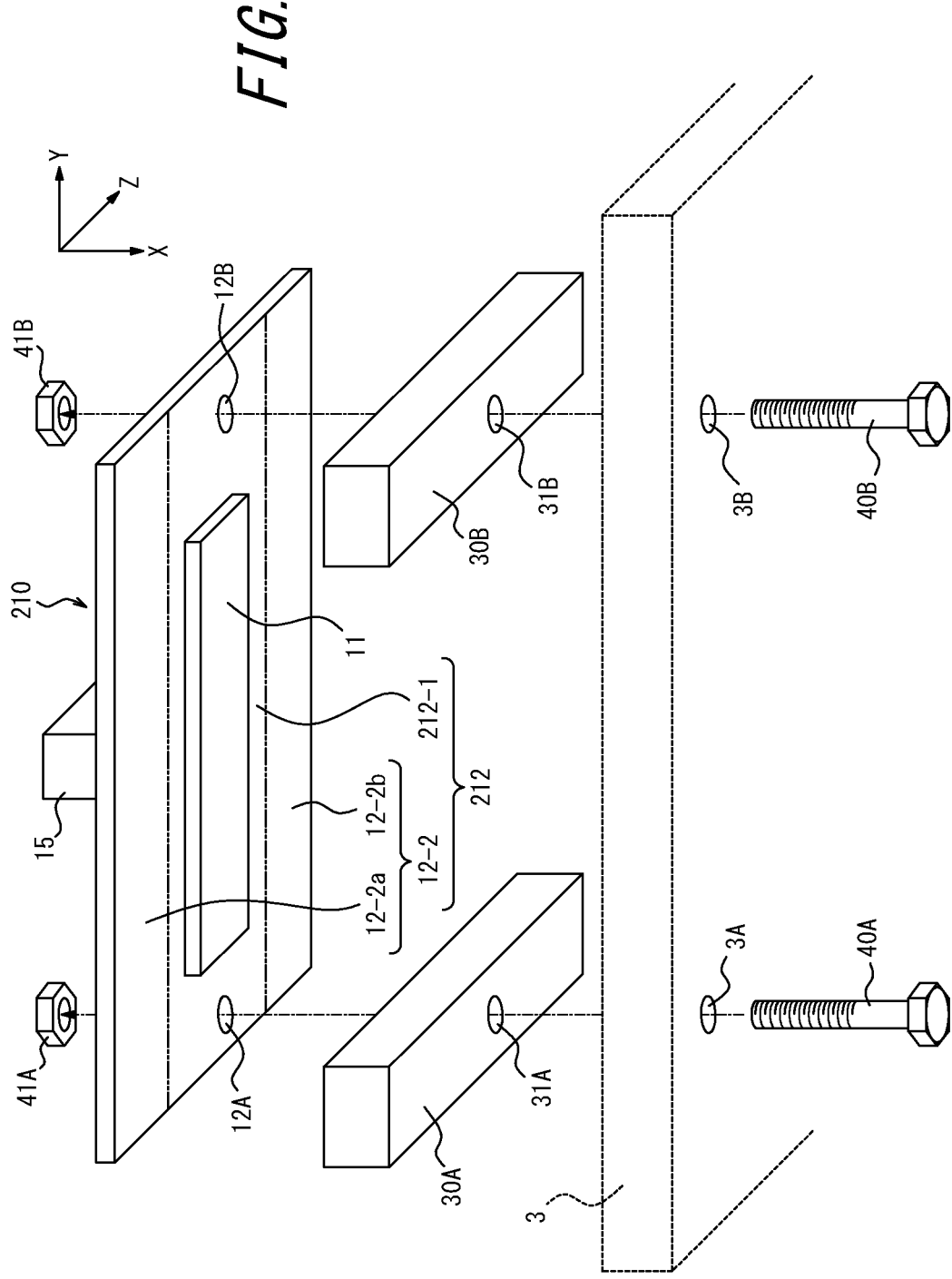
FIG. 8 is a perspective view of an actuator according to still another embodiment of the present disclosure.

FIG. 8 is a perspective view of an actuator 210 according to still another embodiment of the present disclosure. The actuator 210 includes the piezoelectric element 11, a diaphragm 212, and the retainer 15.

The diaphragm 212 has a first plate 212-1 and a second plate 12-2. The first plate 212-1 has the conversion function, in a manner similar to the first plate 12-1 illustrated in FIG. 3 described above. The first plate 212-1 has a first spring constant K1, in a manner similar to the first plate 12-1 illustrated in FIG. 3 described above.

A through hole 12A is formed at one end of the first plate 212-1. A through hole 12B is formed on the other side of the first plate 212-1.

Fixing members 30A and 30B are arranged between the diaphragm 212 and the housing 3. The fixing member 30A has a through hole 31A. The fixing member 30B has a through hole 31B.

One end of the diaphragm 212 is fixed to the housing 3 via the fixing member 30A. For example, a fastening member 40A such as, for example, a bolt or the like is inserted into a through hole 3A, the through hole 31A, and the through hole 12A of the housing 3, and a nut 41A is screwed into the fastening member 40A, whereby one end of the diaphragm 212 is fixed to the housing 3 via the fixing member 30A.

The other end of the diaphragm 212 is fixed to the housing 3 via the fixing member 30B. For example, a fastening member 40B such as, for example, a bolt or the like is inserted into the through hole 3B, the through hole 31B, and the through hole 12B of the housing 3, and a nut 41B is screwed into the fastening member 40B, whereby the other end of the diaphragm 212 is fixed to the housing 3 via the fixing member 30B.

The actuator 210 configured as described above can exert an effect similar to that of the actuator 10 illustrated in FIG. 2 described above.

Although the disclosure has been described based on the figures and the embodiments, it is to be understood that various changes and modifications may be implemented based on the present disclosure by those who are ordinarily skilled in the art. Accordingly, such changes and modifications are included in the scope of the disclosure herein. For example, functions and the like included in each functional unit may be rearranged without logical inconsistency. A plurality of functional units may be combined together or subdivided. Each of the embodiments of the disclosure described above does not need to be practiced strictly following the description thereof but may be implemented by appropriately combining or partially omitting features.

For example, in the embodiments described above, the diaphragm 12 has been described to include the first plate 12-1 for implementing the conversion mechanism and the second plate 12-2 for implementing the support mechanism, for convenience of description. However, the diaphragm 12 as a whole may implement the conversion mechanism and the support mechanism. In this case, the spring constant Ku of the diaphragm 12 may be appropriately adjusted by appropriately determining the shape of the diaphragm 12 as a whole or the material of the diaphragm 12.

For example, in the embodiments described above the vibration object 2 is vibrated in the longitudinal direction by the actuator 10. However, the vibration object 2 may be vibrated in the lateral direction by the actuator 10. In this case, the actuator 10 may be arranged between the vibration object 2 and the housing 3 so that the main surface 12*a* illustrated in FIG. 4 is perpendicular to the main surface 2*a* of the vibration object 2 illustrated in FIG. 2. The same applies to the actuators 110 and 210.

For example, in the embodiments described above the fixing portions 14A and 14B of the actuator 10 are described to be fixed to the housing 3 of the tactile sensation providing apparatus 1. However, the fixing portions 14A and 14B of the actuator 10 may be fixed to a member other than the housing 3. For example, in a case in which the tactile sensation providing apparatus 1 is implemented in a vehicle, the fixing portions 14A and 14B of the actuator 10 may be fixed to a frame of the vehicle. The same applies to the fixing portions 114A to 114D of the actuator 110.

REFERENCE SIGNS LIST 1, 1X tactile sensation providing apparatus
2 vibration object
2*a* main surface
3 housing
10, 10X, 110, 210 actuator
11 piezoelectric element
12, 12X, 112, 212 diaphragm
12-1, 212-1 first plate
12-2, 12-3 second plate
13A, 13B, 113A, 113B, 113C, 113D supporting portion
14A, 14B, 114A, 114B, 114C, 114D fixing portion
15 retainer
20X elastic member
30A, 30B fixing member
3A, 3B, 12A, 12B, 31A, 31B through hole
40A, 40B fastening member
41A, 41B nut

The invention claimed is:

1. An actuator comprising:
a piezoelectric element;
a retainer; and
a diaphragm that has the piezoelectric element attached thereto, and vibrates according to an expanding and contracting displacement of the piezoelectric element,
wherein the diaphragm is configured to convert the expanding and contracting displacement of the piezoelectric element into a vibration in a predetermined direction,
the diaphragm is configured to support a vibration object that provides a tactile sensation of the vibration in the predetermined direction,
the diaphragm includes a first plate having a first spring constant and a second plate having a second spring constant, the first spring constant being determined based on an amplitude of the predetermined direction of the diaphragm and the second spring constant being determined based on an amplitude of the vibration object,
the retainer is disposed between the diaphragm and the vibration object, and
the retainer extends across the first plate and the second plate.

2. The actuator according to claim 1,
wherein a spring constant of the diaphragm is a sum of the first spring constant and the second spring constant.

3. The actuator according to claim 1, wherein the first plate and the second plate are formed of different materials.

4. A tactile sensation providing apparatus comprising:
a vibration object that provides a tactile sensation, and
an actuator including:
a piezoelectric element;
a retainer; and
a diaphragm that has the piezoelectric element attached thereto, and that vibrates according to an expanding and contracting displacement of the piezoelectric element,
wherein the diaphragm is configured to convert the expanding and contracting displacement of the piezoelectric element into a vibration in a predetermined direction, and
the diaphragm is configured to support the vibration object that provides a tactile sensation of the vibration in the predetermined direction,
the diaphragm includes a first plate having a first spring constant and a second plate having a second spring constant, the first spring constant being determined based on an amplitude of the predetermined direction of the diaphragm and the second spring constant being determined based on an amplitude of the vibration object,
the retainer is disposed between the diaphragm and the vibration object, and
the retainer extends across the first plate and the second plate.

5. The tactile sensation providing apparatus according to claim 4,
wherein the tactile sensation providing apparatus does not include an elastic member.

6. The tactile sensation providing apparatus according to claim 4, wherein the first plate and the second plate are formed of different materials.

7. An actuator comprising:
a piezoelectric element;
a retainer; and
a diaphragm that has the piezoelectric element attached thereto, the diaphragm configured to:
  vibrate according to an expanding and contracting displacement of the piezoelectric element,
  convert the expanding and contracting displacement of the piezoelectric element into a vibration in a predetermined direction, and
  support a vibration object that provides a tactile sensation of the vibration in the predetermined direction,
wherein the diaphragm includes a first plate having a first spring constant and a second plate having a second spring constant, the first spring constant being determined based on an amplitude of the predetermined direction of the diaphragm and the second spring constant being determined based on an amplitude of the vibration object,
the retainer is disposed between the diaphragm and the vibration object, and
the retainer extends across the first plate and the second plate.

8. The actuator according to claim 7, wherein the first plate and the second plate are formed of different materials.

* * * * *